United States Patent
Peng et al.

(10) Patent No.: US 12,154,472 B2
(45) Date of Patent: Nov. 26, 2024

(54) ELECTRONIC DEVICE WITH FORWARDING MODULE FOR OUTPUTTING DISPLAY SIGNALS

(71) Applicant: Lenovo (Beijing) Limited, Beijing (CN)

(72) Inventors: Jingang Peng, Beijing (CN); Feng Shen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/684,009

(22) Filed: Mar. 1, 2022

(65) Prior Publication Data

US 2023/0099066 A1    Mar. 30, 2023

(30) Foreign Application Priority Data

Sep. 28, 2021   (CN) .......................... 202111141853.3

(51) Int. Cl.
*G09G 3/20* (2006.01)

(52) U.S. Cl.
CPC ....... *G09G 3/20* (2013.01); *G09G 2320/0626* (2013.01); *G09G 2360/04* (2013.01); *G09G 2360/06* (2013.01)

(58) Field of Classification Search
None
See application file for complete search history.

(56) References Cited

U.S. PATENT DOCUMENTS

| | | | |
|---|---|---|---|
| 2009/0179903 A1* | 7/2009 | Lee | G06F 1/3203 345/503 |
| 2014/0055465 A1* | 2/2014 | Diercks | G06T 15/005 345/506 |
| 2014/0253565 A1* | 9/2014 | Bakalash | G06F 9/505 345/505 |
| 2021/0304365 A1* | 9/2021 | Bhattacharjee | G06T 5/008 |
| 2022/0270539 A1* | 8/2022 | Lu | G09G 3/2096 |

* cited by examiner

*Primary Examiner* — Amr A Awad
*Assistant Examiner* — Donna V Bocar
(74) *Attorney, Agent, or Firm* — ANOVA LAW GROUP, PLLC

(57) ABSTRACT

An electronic device. The electronic device includes a first processor configured to generate a first display signal, and a second processor configured to generate a second display signal and output to a display area. The second processor includes a forwarding module, the first processor is connected to the forwarding module, and the first display signal generated by the first processor is output to the display area through the forwarding module.

18 Claims, 8 Drawing Sheets

ELECTRONIC DEVICE WITH FORWARDING MODULE FOR OUTPUTTING DISPLAY SIGNALS

CROSS-REFERENCES TO RELATED APPLICATION

This application claims priority to Chinese Patent Application No. 202111141853.3 filed on Sep. 28, 2021, the entire content of which is incorporated herein by reference.

FIELD OF TECHNOLOGY

The present disclosure relates to the field of computer technology and, more specifically, to an electronic device.

BACKGROUND

In order to improve user experience, electronic devices that can support dynamic switching technology of the discrete graphic card and the integrated graphic card have become increasingly popular in the field of computer technology. In conventional technology, in order to support the dynamic switching technology of the discrete graphic card and the integrated graphic card, a large number of logic circuits need to be added to the motherboard of the electronic device, such that the discrete graphic card and the integrated graphic card are connected to the logic circuits respectively. The switching between the discrete graphic card and the integrate graphic card is realized through the logic control of the logic circuits. After switching, the discrete graphic card or the integrate graphic card can output the display signal. However, the added logic circuits occupy a large amount of space on the motherboard, which reduces the performance of the electronic device.

BRIEF SUMMARY OF THE DISCLOSURE

One aspect of the present disclosure provides an electronic device. The electronic device includes a first processor configured to generate a first display signal, and a second processor configured to generate a second display signal and output to a display area. The second processor includes a forwarding module, the first processor is connected to the forwarding module, and the first display signal generated by the first processor is output to the display area through the forwarding module.

Another aspect of the present disclosure provides a display method for an electronic device having a first processor and a second processor. The method includes generating, by the first processor, a first display signal; generating, by the second processor, a second display signal; and outputting, by the second processor, the second display signal to a display area. The second processor includes a forwarding module, the first processor is connected to the forwarding module, and the first display signal generated by the first processor is output to the display area through the forwarding module.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
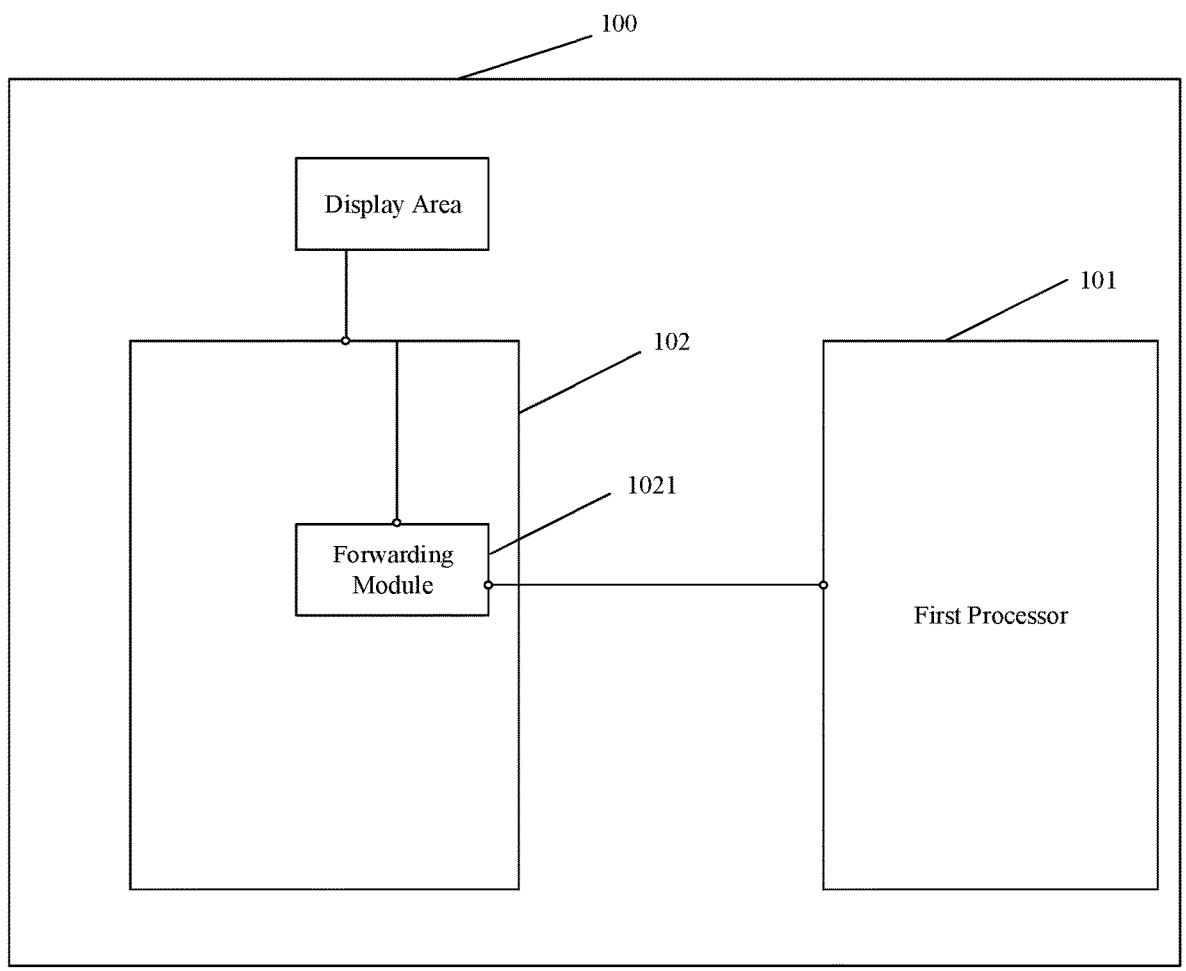
FIG. 1 is a schematic structural diagram of an electronic device according to an embodiment of the present disclosure.

Embodiments of the present disclosure provide an electronic device. As shown in FIG. 1, an electronic device 100 includes a first processor 101 and a second processor 102. The first processor 101 may be configured to generate a first display signal, and the second processor 102 may be configured to generate a second display signal and output the second display signal to a display area (the display area shown in FIG. 1 may be the display area of the electronic device).

The second processor 102 includes a forwarding module 1021. The first processor 101 is connected to the forwarding module 1021, and the first display signal generated by the first processor 101 may be output to the display area through the forwarding module 1021.

It should be noted that the first processor and the second processor may be different types of processors with graphic processing capabilities. A central processing unit (CPU) may transmit the graphic data to the first processor and/or the second processor through a data bus. The first processor and/or second processor may process the graphic data such that the first processor can generate the first display signal and the second processor can generate the second display signal. In some embodiments, the graphic data may include, but is not limited to, image data and video data. Processors with graphic processing capabilities may include integrated graphic cards, discrete graphic cards, and core graphic cards. When the second processor determines to receive the first display signal of the first processor, the first display signal can be received by the forwarding module, and the first display signal can be forwarded to the display area by the forwarding module. In some embodiments, the integrated graphic card may be represented by iGPU, and the discrete graphic card may be represented by dGPU.

In the embodiments of the present disclosure, a first output of the first processor may be connected to an input of the forwarding module of the second processor. The second processor may receive the first display signal of the first processor through the forwarding module, and may output the first display signal of the first processor and/or the second display signal generated by the second processor to the display area. In some embodiments, the display area may include, but is not limited to, the display area of the display screen or a projection area, and there may be a plurality of display areas. The second processor may be configured to determine to output the first display signal and/or the second display signal to the display area by monitoring an application program running on the electronic device.

In some embodiments, the display effect and operational performance of the first processor may be high than those of the second processor. The second processor may be configured to determine to output the first display signal and/or the second display signal based on the type of the currently running program. More specifically, the graphic data of the currently running application program may be respectively transmitted to the first processor and the second processor through the data bus through the CPU. When the second processor detects that the type of application program currently running on the electronic device is a game or video editing, the second processor may receive the first display signal form the first processor through the forwarding module, and output the first display signal to the display area. When it is detected that the type of the currently running application is an office application, the forwarding module may not receive the first display signal, and the second processor itself may process the graphic data of the office application program transmitted by the CPU, and output the second display signal to the display area.

In addition, a program whitelist and a program blacklist may also be stored in the second processor. In some embodiments, the processing volume of graphic data generated by the application programs involved in the program whitelist may be relatively large, while the processing volume of graphic data generated by the application programs involved in the program blacklist may be relatively small. The second processor may be configured to match an identifier of the currently running application program with the identifiers of the application programs in the program whitelist and the identifiers of the application programs in the program blacklist respectively. When it is determined that the identifier of the currently running application program matched the identifier of the application program in the program whitelist, a control instruction may be issued to control the first processor to process the graphic data, generated the first display signal, and output the first display signal to the display area through the forwarding module. When it is determined that the identifier of the currently running application program matched the identifier of the application program in the program blacklist, the second processor itself may process the graphic data and output the second display signal to the display area.

The display area may include at least a first display area and a second display area, and the second processor may be configured to forward the first display signal to the first display area and the second display area through the forwarding module. The second processor may also output the second display signal to the first display area and the second display area. The second processor may also output the first display signal to the first display area and output the second display signal to the second display area; or, output the first display signal to the second display area and output the second display signal to the first display area. In some embodiments, the display area may be a display area of the electronic device, or may be a display area outside the electronic device.

Consistent with the present disclosure, the electronic device can receive the first display signal generated by the first processor through the forwarding module of the second processor, and output the first display signal and/or the second display signal to the display area through the second processor. In this way, there is no need to arrange a large number of logic circuits on the motherboard of the electronic device to realize the switching of the output signals of the first processor and the second processor, which reduces the space occupation rate on the motherboard and further improves the performance of the electronic device.

In other embodiments of the present disclosure, the first processor may be a discrete graphic card, and the second processor may be an integrate graphic card.

In some embodiments, when the integrate graphic card detects that the current program running on the electronic device is a gaming program, a control instruction may be issued to cause the discrete graphic card to process the graphic data of the gaming program transmitted by the CPU and generate the first display signal, and send the first display signal to the forwarding module of the integrated graphic card. In this way, the forwarding module can receive the first display signal forward the first display signal to the display area. When the integrated graphic card detects that the current program running on the electronic device is an office program, the integrated graphic card itself may process the graphic data of the office program, generate the second display signal, and output the second display signal to the display area.

Figure 2:
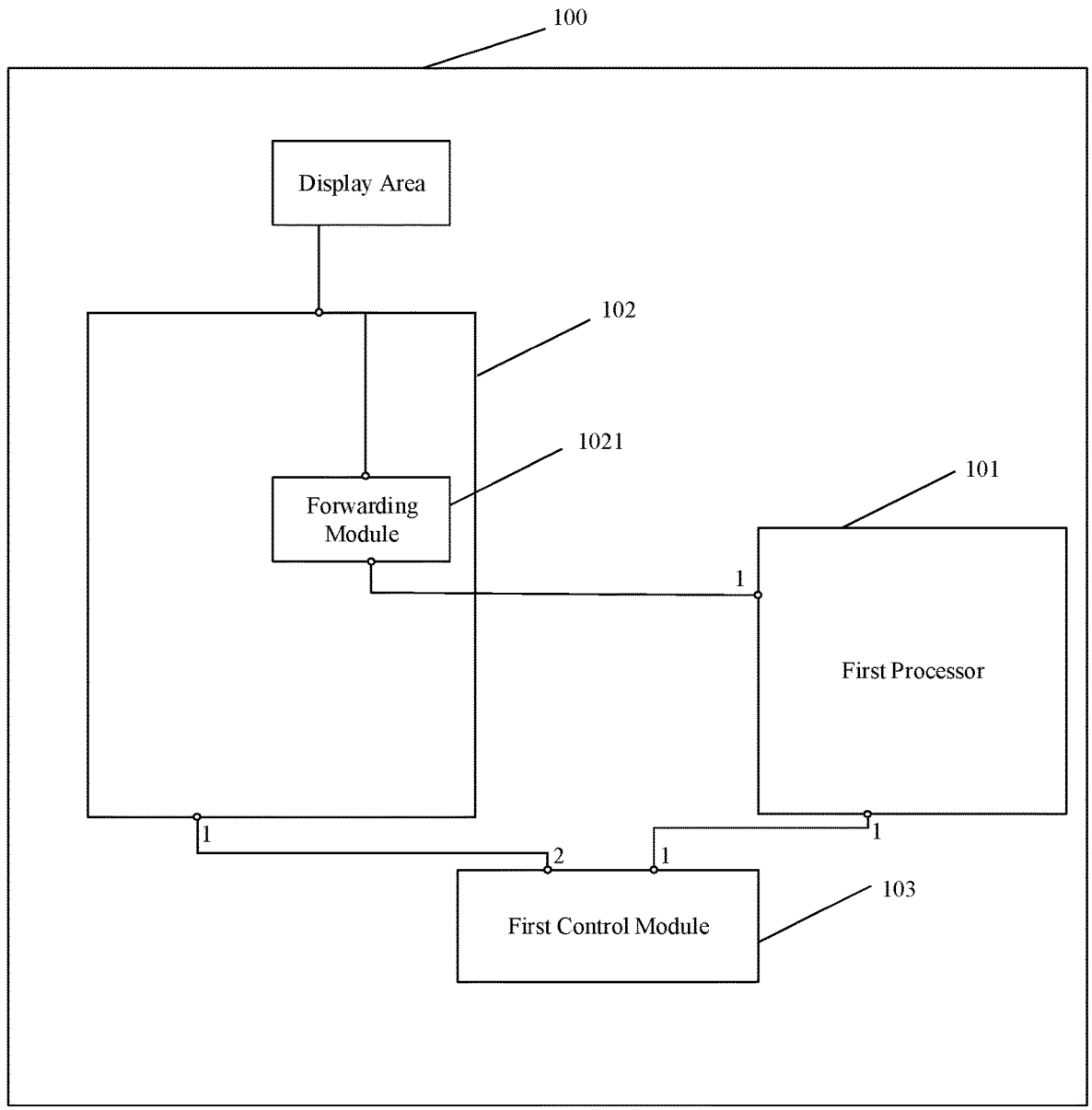
FIG. 2 is a schematic structural diagram of the electronic device according to an embodiment of the present disclosure.

In other embodiments of the present disclosure, as shown in FIG. 2, the electronic device 100 further includes a first control module 103.

A first output of the first control module 103 is connected to a first input of the first processor 101, and the second output of the first control module 103 is connected to a first input of the first control module 103 to control the first control module 103 to output the first display signal and/or the second display signal to the display area, and to control the connection between the first output of the first processor 101 and the input of the forwarding module 1021 in the second processor 102.

In some embodiments, the first control module may be a small-sized microcontroller unit (MCU), which is also known as a single-chip microcomputer or a single-chip computer. The first control module may also be other types of control devices that are smaller in size and suitable for being installed inside the electronic device.

In the embodiments of the present disclosure the first control module may be used to receive the user's input operation instruction, determine to use the first processor and/or the second processor to process the graphic data of the application program running on the electronic device based on the user's input operation instruction, generate the corresponding control instruction, send the control instruction to the first processor and/or the second processor, such that the first processor and/or the second processor may process the graphic data of the application program running on the electronic device, and output the first display signal and/or the second display signal through the second processor. The first control module may also monitor the application programs running on the electronic device, determine, based on the running application program, to use the first processor and/or the second processor to process the graphic data of the running application program, and generate the control instruction.

In some embodiments, when it is determined that the first processor is used to process the graphic data of the running application program, the first control module may issue a first control instruction to the first processor such that the first processor can process the graphic data of the running application program, and control the first output of the first processor to be connected to the input of the forwarding module in the second processor. In this way, the forwarding module can receive the first display signal of the first processor and output the first display signal to the display area. When it is determined that the second processor is used to process the graphic data of the running application program, the first control module may issue a second control instruction to the second processor, such that the second processor can process the graphic data of the running application program, and output the first display signal to the display area. When the application program running on the electronic device includes at least a first application program and a second application program, the first control module may send the first control instruction to the first processor and control the first input of the first processor to be connected to the forwarding module. In this way, the first processor can process the graphic data of the first application program and output the first display signal to the first display area through the forwarding module. At the same time, the first control module may send a second control instruction to the second processor. In this way, the second processor can process the graphic data of the second application program and output the second display signal to the second display area. In some embodiments, the display area may include a first display area and a second display area.

Figure 3:
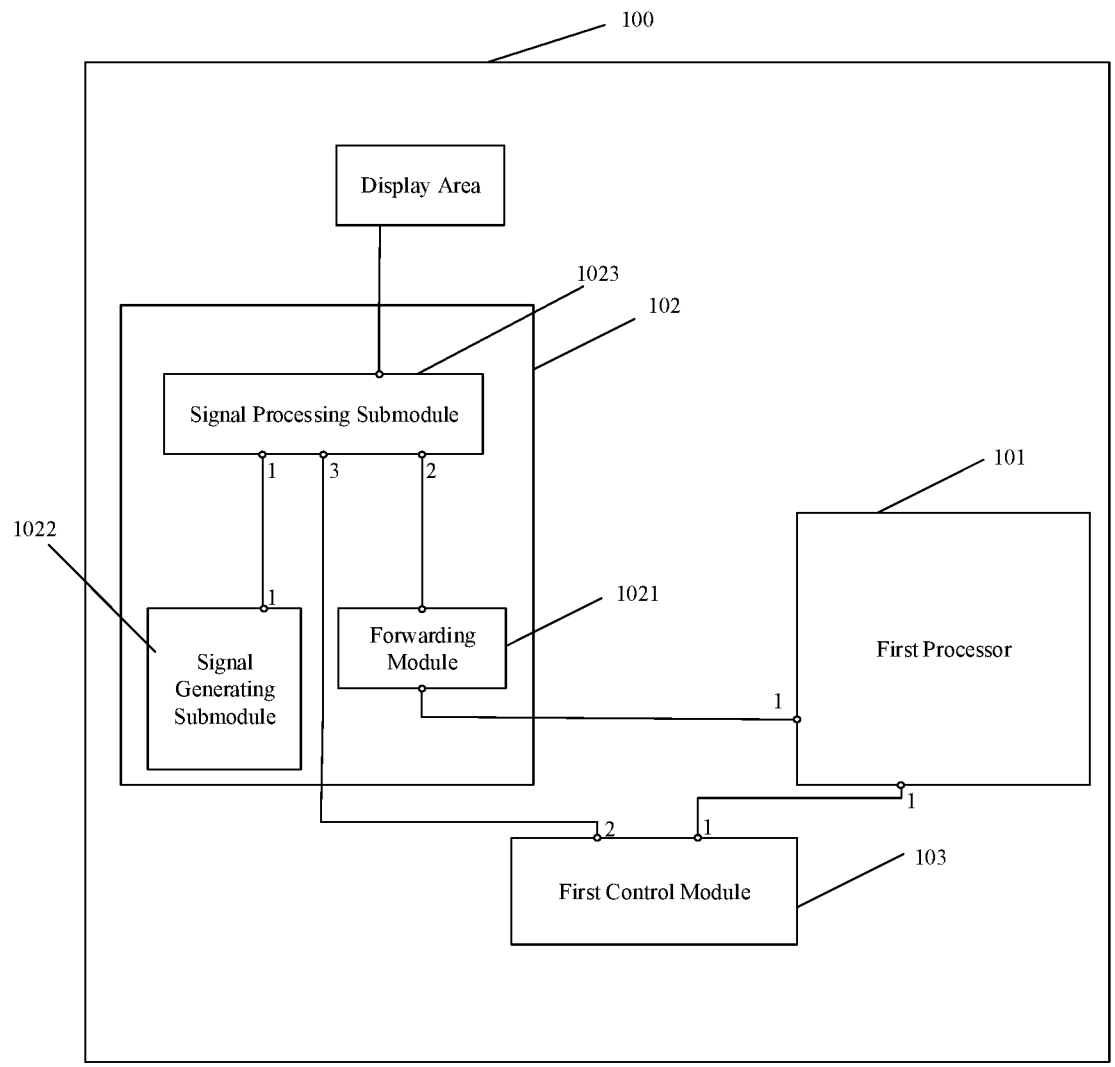
FIG. 3 is a schematic structural diagram of the electronic device according to an embodiment of the present disclosure.

In other embodiments of the present disclosure, as shown in FIG. 3, the second processor 102 further includes a signal generating submodule 1022 and a signal processing submodule 1023.

A first input of the signal processing submodule 1023 is connected to a first output of the signal generating submodule 1022, and/or a second input of the signal processing submodule 1023 is connected to the output of the forwarding module 1021. A third input of the signal processing submodule 1023 is connected to a second output of the first control module 103. The signal processing submodule 1023 may be configured to output the first display signal and/or the second display signal to the display area.

In the embodiments of the present disclosure, the signal generating submodule may be configured to receive the graphic data of the application program running on the electronic device, and process the graphic data of the application program to generate the second display signal. When the first input of the signal processing submodule is connected to the first output of the signal generating submodule, the second display signal may be sent to the signal processing submodule, and the signal processing submodule may output the second display signal to the display area. When the second output of the signal processing submodule is connected to the output of the forwarding module, the forwarding module may send the first display signal to the signal processing submodule, and the signal processing submodule may output the first display signal to the display area. In some embodiments, the first control module may control the first input of the signal processing submodule to be connected to the first output of the signal generating submodule, and/or the second output of the signal processing submodule to be connected to the output of the forwarding module.

In some embodiments, when the first control module determines that the second processor needs to be used to process the graphic data of the application program running on the electronic device, a third control instruction may be generated to control the connection between the first input of the signal processing submodule and the first output of the signal generating submodule, and to switch the channel for transmitting the display signal in the signal processing submodule to the transmission channel of the second display signal to receive the second display signal input by the signal generating submodule, and output the second display signal to the display area. When the first control module determines that the first processor needs to be used to process the graphic data of the application program running on the electronic device, a fourth control instruction may be generated to control the second input of the signal processing submodule to be connected to the forwarding module, and switch the channel for transmitting the display signal in the signal processing submodule to the transmission channel for the first display signal to receive the first display signal of the first processor forwarded by the forwarding module, and output the first display signal to the display area. In some embodiments, the third control instruction and the fourth control instruction may be sent to the signal processing submodule at the same time. In this way, the signal processing submodule may simultaneously receive the first display signal and the second display signal, output the first display signal to the first display area, and output the second display signal to the second display area.

In other embodiments of the present disclosure, the signal processing submodule may also include a shaping submodule. An input of the shaping submodule may be connected to the output of the forwarding module, and may receive the first display signal, perform shaping processing on the first display signal, and output the first display signal to the display area.

The first display signal may be transmitted to the forwarding module in the second processor through a peripheral circuit. During the transmission process, the first display signal may be attenuated during the transmission process, the amplitude may be reduced, and the leading edge may become worse after encountering a capacitive load. At this time, the first display signal may be shaped by the shaping submodule to store the first display signal to a rectangular pulse signal and improve the display effect of the first display signal in the display area.

Figure 4:
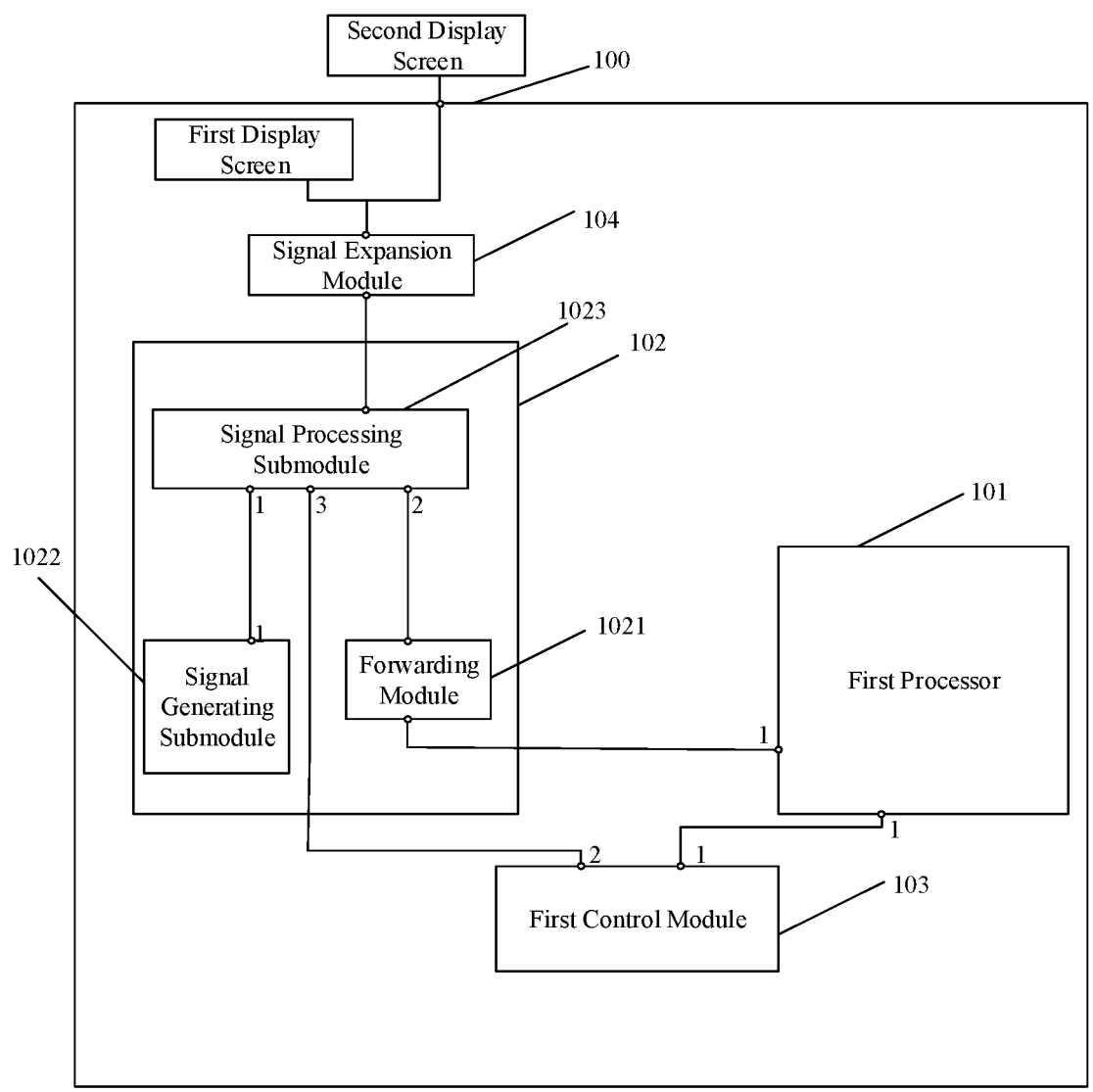
FIG. 4 is a schematic structural diagram of the electronic device according to an embodiment of the present disclosure.

In other embodiments of the present disclosure, as shown in FIG. 4, the electronic device 100 further includes a signal expansion module 104.

An input of the signal expansion module 104 is connected to the output of the signal processing submodule 1023, a first output of the signal expansion module 104 is connected to a first display screen of the electronic device 100, and a second output of the signal expansion module 104 is connected to a second display screen through a target interface. In this way, the signal expansion module 104 may be used to receive the first display signal and/or the second display signal input by the signal processing submodule 1023, output the first display signal or the second display signal to the display area of the first display screen, and output the first display signal or the second display signal to the display area of the second display screen.

In some embodiments, the second display screen may be a display screen connected to the electronic device through the target interface.

In some embodiments, the target interface may include, but is not limited to, a Type-C interface and a high-definition multimedia interface (HDMI).

In the embodiments of the present disclosure, the signal expansion module may be used to output the first display signal and/or the second display signal to the display area of the first display screen and the display area of the second display screen, thereby realizing simultaneous support of display switching of the display screen internally connected to the electronic device and the display screen connected to the electronic device through the target interface when the first processor and the second processor are dynamically switched. In conventional technology, the switching between the first display signal and the second display signal can only be realized on the internal display screen of the electronic device. The technical solutions of the present disclosure can not only realize the switching of the first display signal and the second display signal on the internal display screen of the electronic device, but can also realize the switching of the first display signal and the second display signal on an external display screen of the electronic device through the target interface, which improves the intelligence of dynamic switching and the convenience of use.

In some embodiments, the signal expansion module may be configured to process the first display signal and/or the second display signal output by the signal processing submodule, and increase the bandwidth of the first display signal and/or the second display signal by increasing the frequency of the first display signal and/or the second display signal, and further improve the transmission rate.

It should be noted that the signal expansion module expanding and processing the signal can be understood as expanding the received one-channel signal into a multi-channel signal. In some embodiments, the signal expansion module may receive the first display signal input by the signal processing submodule, expand the first display signal to obtain a first sub-display signal and a second sub-display signal, output the first sub-display signal to the display area of the first display screen, and output the second sub-display signal to the display area of the second display screen.

In other embodiments, the display screen may include two display screens externally connected to the electronic device through the target interface, and two display screens internally connected to the electronic device. The signal expansion module may expand the first display signal into the first sub-display signal and the second sub-display signal, and output the first sub-display signal and the second sub-display signal respectively to the display areas of the two display screens externally connected through the target interface. The signal expansion module may also expand the second display signal into a third sub-display signal and a fourth sub-display signal, and output the third sub-display signal and the fourth sub-display signal respectively to the display areas of the two display screens internally connected to the electronic device.

Figure 5:
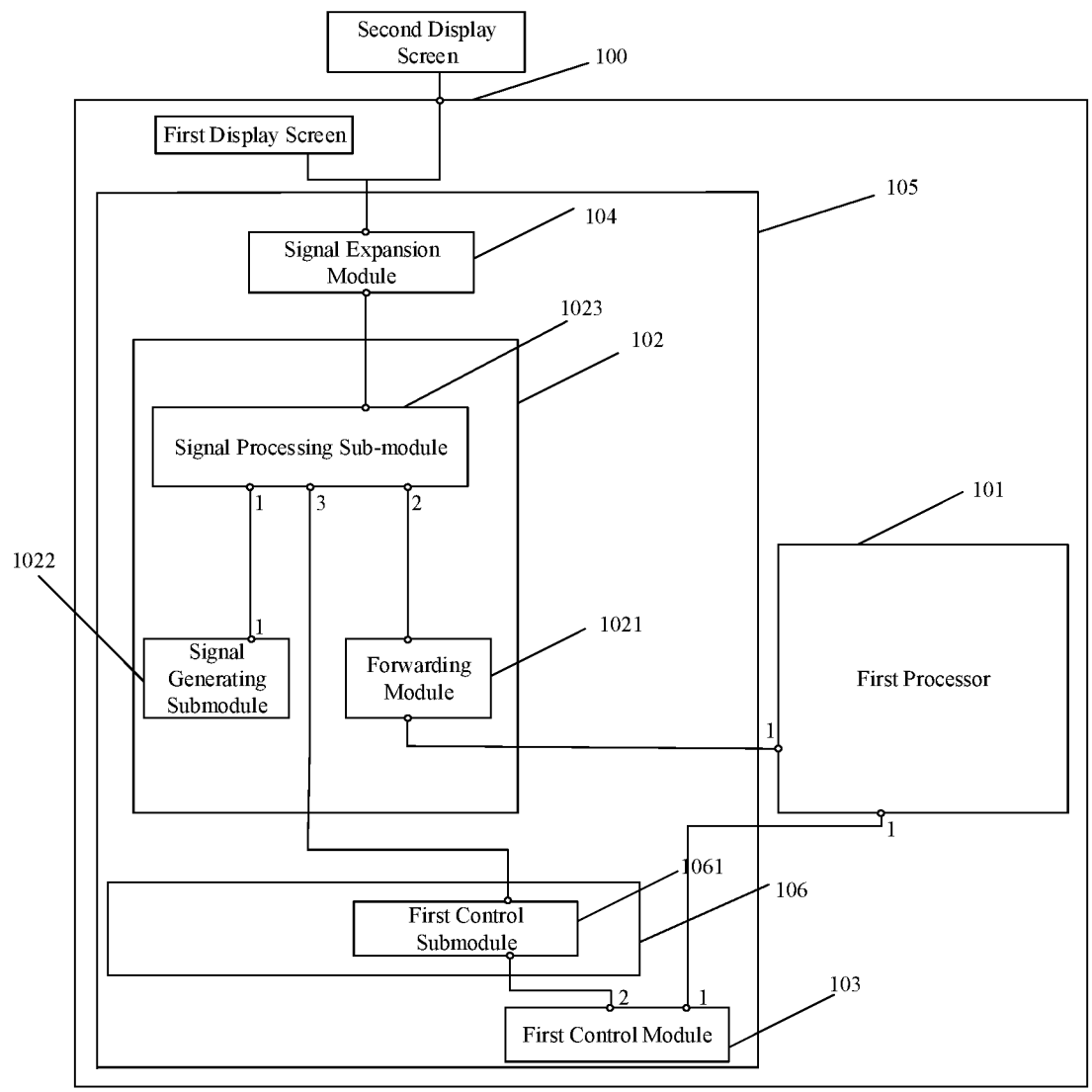
FIG. 5 is a schematic structural diagram of the electronic device according to an embodiment of the present disclosure.

In other embodiments of the present disclosure, as shown in FIG. 5, the electronic device 100 further includes a processing unit 105.

In some embodiments, the second processor 102 may be disposed in the processing unit 105.

In some embodiments, the processing unit may be a central processing unit, and the second processor may be an integrated graphic card. The integrated graphic card and the signal expansion module may be integrated inside the central processing unit to reduce the space occupancy on the motherboard and improve the performance of the electronic device without adding a large number of logic circuits or logic devices to the motherboard, which reduces the production costs. In addition, when the second processor or the integrated graphic card fails, only the central processing unit needs to be replaced instead of the entire motherboard, which also reduces the maintenance costs.

In other embodiments of the present disclosure, as shown in FIG. 5, the processing unit 105 further includes a second control module 106. The second control module 106 includes a first control submodule 1061. An input of the first control submodule 1061 is connected to the second output of the first control module 103, and the output of the first control submodule 1061 is connected to the third input of the signal processing submodule 1023. The first control submodule 1061 may be configured to control the signal processing submodule 1023 to be connected to the forwarding module 1021 and/or the signal processing submodule 1023 to be connected to the signal generating submodule 1022 based on a first control signal input by the first control module 103.

In the embodiments of the present disclosure, the first control module may be a core control module in an operating system on the electronic device, and the second control module may be a control module for managing and controlling the first processor and the second processor. In order to reduce the workload of the first control module, the first control module may monitor the application programs running on the electronic device, and send the graphic data of the application programs to the second control module. The first control submodule in the second control module may be configured to determine to use the first processor and/or the second processor to process the graphic data based on the graphic data of the application programs, and generate the corresponding control instruction. The control instruction may be used to control first processor and/or the second processor to process the graphic data, and output the first display signal and/or the second display signal to the display area.

It should be noted that the first control module may be disposed in the processing unit, or the first control module may be disposed outside the processing unit. As shown in FIG. 5, the first control module is disposed in the processing unit.

Figure 6:
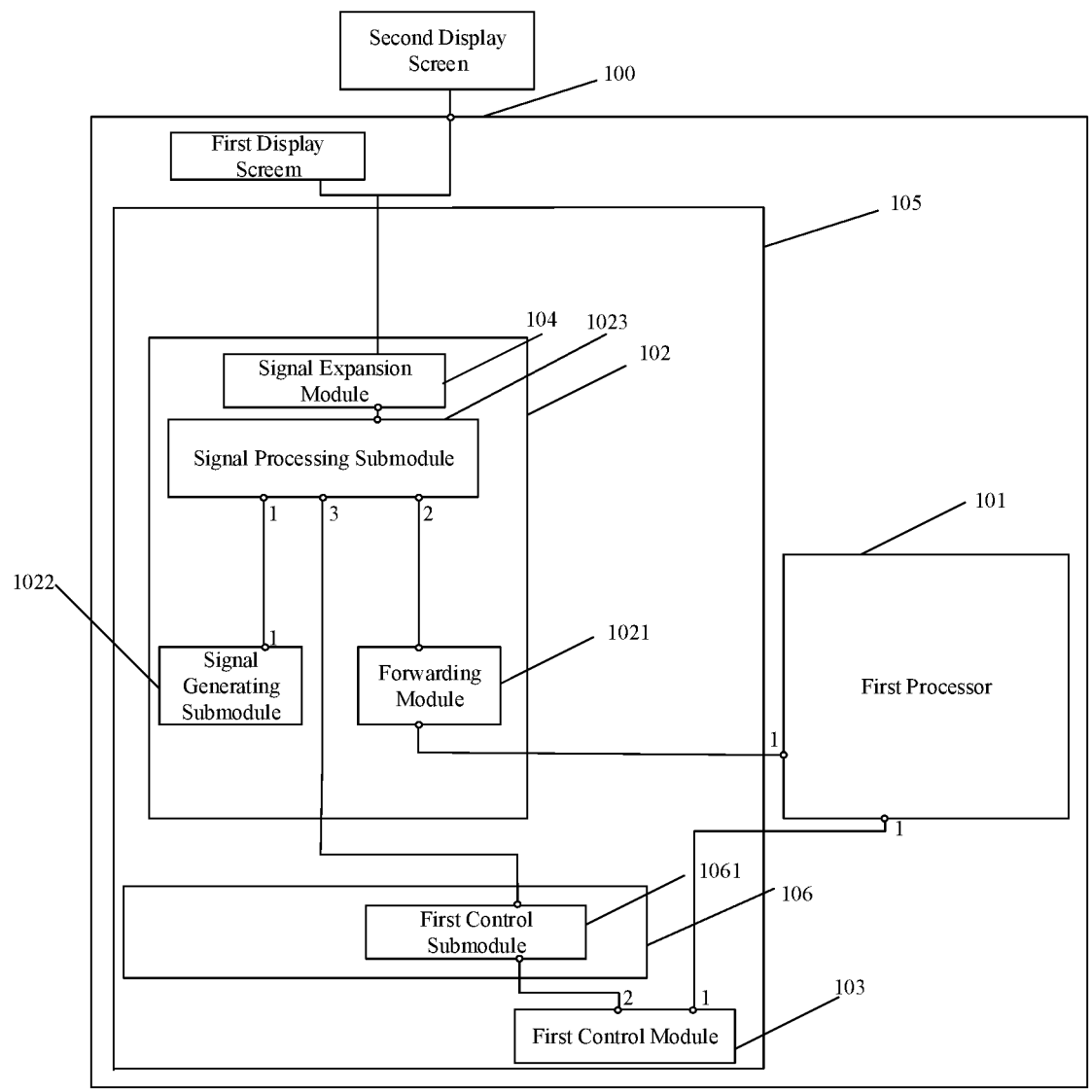
FIG. 6 is a schematic structural diagram of the electronic device according to an embodiment of the present disclosure.

In other embodiments of the present disclosure, as shown in FIG. 6, the signal expansion module 104 is disposed in the second processor 102.

In order to reduce the space occupancy of the motherboard, the signal expansion module may also be integrated inside the second processor. The second processor can be used to output the first display signal and/or the second display signal to the display area, and does not need additional logic circuits other than the first processor and the second processor. In this way, the production cost is reduced, the space occupancy on the motherboard is further reduced, and the performance of the electronic device is improved.

Figure 7:
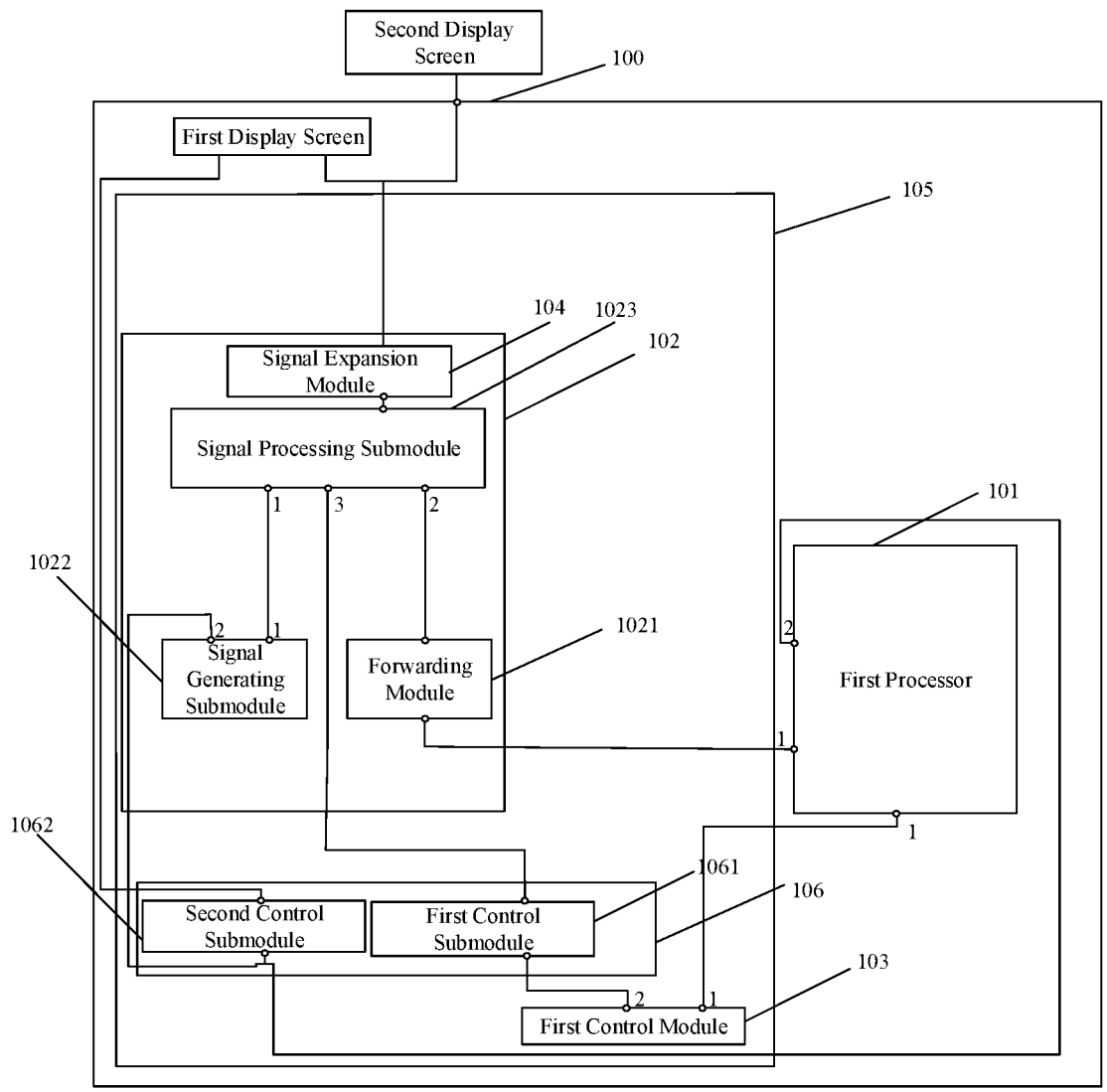
FIG. 7 is a schematic structural diagram of the electronic device according to an embodiment of the present disclosure.

In other embodiments of the present disclosure, as shown in FIG. 7, the second control module 106 further includes a second control submodule 1062 is disposed in the second processor 102.

The input of the second control submodule 1062 is respectively connected to the second output of the signal generating submodule 1022 and the second output of the first processor 101, and the output of the second control submodule 1062 is connected to the first display screen. The second control submodule 1062 may be configured to receive a second control signal input by the signal generating submodule 1022 or the first processor 101, and control the first display screen to adjust the brightness based on the second control signal.

In some embodiments, when there is one first display screen, the second control submodule may be configured to receive a first enable signal output by the first processor or a second enable signal output by the signal generating submodule, and output the first enable signal or the second enable signal to control the first display screen to adjust the brightness of the display. When there are two first display screens, the first display screens may include a first sub-display screen and a second sub-display screen, and the second control submodule may be configured to receive the first enable signal output by the first processor, and use the first enable signal to control the first sub-display screen to adjust its brightness, and receive the second enable signal output by the second processor, and use the second enable signal to control the second sub-display screen to adjust its brightness.

It should be noted that when it is determined to use the first processor to process the graphic data of the application program, the second control submodule may switch the channel for transmitting the enable signal for controlling the first display screen to adjust the brightness to the channel for transmitting the first enable signal. In this way, the second control submodule can receive the first enable signal and transmit the first enable signal to the first display screen through the transmission channel of the first enable signal, such that the first display screen can adjust its brightness. Similarly, when it is determined to use the second processor to process the graphic data of the application program, the second control submodule may switch the channel for transmitting the enable signal for controlling the first display screen to adjust the brightness to the channel for transmitting the second enable signal. Further, the second control submodule may also open the transmission channel of the first enable signal and the transmission channel of the second enable signal at the same time, transmit the first enable signal to the first sub-display screen, and transmit the second enable to the second sub-display screen.

Figure 8:
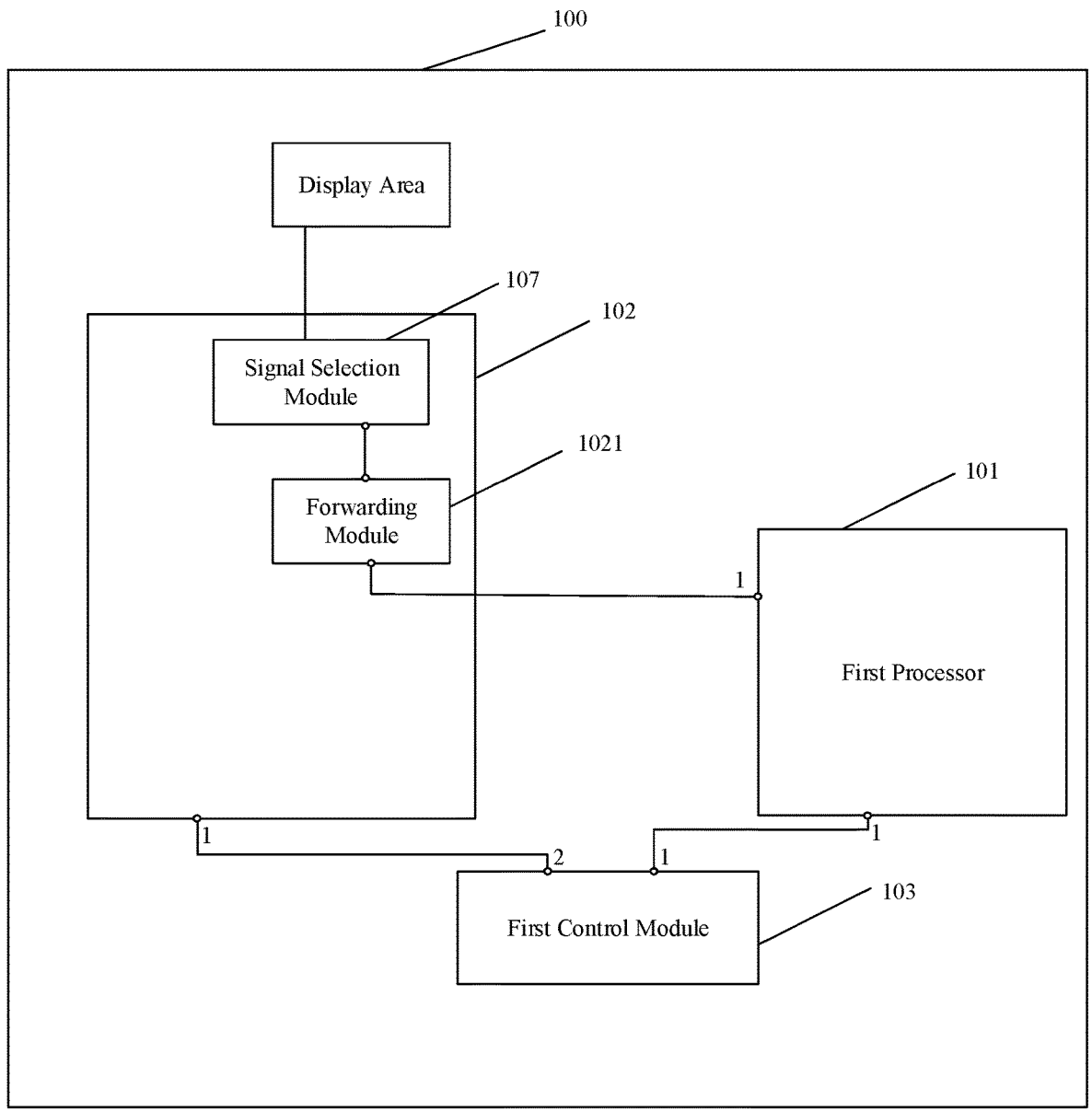
FIG. 8 is a schematic structural diagram of the electronic device according to an embodiment of the present disclosure.

In this way, the second control submodule can receive the first enable signal and transmit the first enable signal to the first display screen through the transmission channel of the first enable signal, such that the first display screen can adjust its brightness In other embodiments of the present disclosure, as shown in FIG. 8, the second processor 102 further includes a signal selection module 107.

An input of the signal selection module 107 is connected to the output of the forwarding module 1021. The signal selection module 107 may be configured to determine and output the first display signal and/or the second display signal to the display area.

The first processor and the second processor may separately process the graphic data of the application program running on the application program. The first processor may generate the first display signal after processing the graphic data of the application program and send the first display signal to the forwarding module. The forwarding module may send the first display signal to the signal selection module in the second processor to determining to output the first display signal and/or the second display signal to the display area based on the application program running on the electronic device.

It should be noted that the term "first", "second" and "third" inputs/outputs of the modules and units involved in the accompanying drawings are represented by "1", "2" and "3" in FIGS. 2-7.

It should be understood that the embodiments described herein are provided to explain the present disclosure, rather than limiting the present disclosure.

The computer-readable storage medium/memory includes at least one of a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic storage medium, an optical disk, or a compact disk read-only memory (CD-ROM). The computer-readable storage medium may also be various terminals including one or any combination of the above memories, such as mobile phones, computers, tablet devices, and personal digital assistants, etc.

It should be noted that, in the embodiments of the present disclosure, the terms "include", "contain" or other alternatives shall be non-exclusiveness, the inclusion of a series of element such as process, method, object or equipment shall include not only the already mentioned elements but also those elements not mentioned, and shall include the elements which are inherent in the process, method, object or equipment. However, under the condition of no more limitations, the definition of an essential element limited by the sentence "including a . . . " shall not obviate that in addition to containing the said essential element in the process, method, object or equipment, other essential element of the same nature may also exist in the above-mentioned process, method, object or equipment.

The sequence numbers of the embodiments of the present disclosure are only for describing information, and do not represent merit or demerit of the embodiments.

Through the description of the foregoing embodiments, those skilled in the art can clearly understand that the method in the foregoing embodiments can be implemented in software together with general-purpose hardware or in hardware only. However, in most cases, the former is preferred. Based on such understanding, the essential portion of the technical solution of the present disclosure or the contribution in addition to the existing technology can be embodied in the form of a software product. The computer software product stored in a storage medium (such as ROM/RAM, magnetic disk, CD-ROM) includes a plurality of program instructions causing a terminal device (such as a mobile phone, a computer, a server, an air conditioner, and a network device) to perform the processes of the information processing method provided by the embodiments of the present disclosure.

The present disclosure is described with reference to flowcharts and/or block diagrams of a method, a device (system), and a computer program product according to the embodiments of the present disclosure. Each flow and/or block of the flowcharts and/or block diagrams, and a combination of the flow and/or block of the flowcharts and/or block diagrams may be implemented by computer program instructions. The computer program instructions may be provided to a processor of a general-purpose computer, special-purpose computer, embedded processor, or other programmable data processing device to produce a machine, so that the device can be produced for implementing the functions determined by one or more flows of the flowcharts and/or one or more blocks of the block diagrams through the instructions executed by the processors of the computer or other programmable data processing equipment.

The computer program instructions may also be stored in computer-readable memory, which can direct the computer or other programmable data processing equipment to work in a particular manner, so that the instructions stored in the computer-readable memory produce a manufacturing product including an instruction device. The instructions implement the functions determined by one or more flows of the flowcharts and/or one or more blocks of the block diagram.

The computer instructions may also be loaded on the computer or other programmable data processing equipment, so that a series of operation processes are executed on the computer or other programmable data processing equipment to produce a computer-implemented process. Therefore, the instructions executed on the computer or other programmable data processing equipment provide the process to implement the functions determined by one or more flows of the flowchart and/or one or more blocks of the block diagrams.

The above are some embodiments of the present disclosure, and are not intended to limit the scope of the present disclosure. Any equivalent structural transformation made by using the description and drawings of the present disclosure or made by directly or indirectly using the present disclosure in other related technical fields are included in the scope of the present disclosure.

What is claimed is:

1. An electronic device comprising:
   a first processor configured to generate a first display signal;
   a second processor configured to generate a second display signal and output to a display area;
   a first control module, a first output of the first control module being directly connected to a first input of the first processor; and
   a processing unit including a second control module, the second processor being disposed in the processing unit, a second output of the first control module being connected to a first input of the second processor through the second control module;
   wherein:
   the second processor includes a forwarding module, the first processor is directly connected to the forwarding module, and the first display signal generated by the first processor is output to the display area through the forwarding module;
   the first control module is configured to control the second processor to output the first display signal and/or the second display signal to the display area, and to control a first output of the first processor to be connected to an input of the forwarding module in the second processor;
   the second control module is configured to receive a control signal input by the first processor, and control the display area to adjust brightness based on the control signal;
   the second control module includes a first control submodule and a second control submodule, the second output of the first control module being connected to the first input of the second processor through the first control submodule; and
   an input of the second control submodule is directly connected to an output of a signal generating submodule of the second processor and a second output of the first processor, and an output of the second control submodule is connected to the first display screen.

2. The electronic device of claim 1, wherein:
   the second processor further includes a signal generating submodule and a signal processing submodule, wherein:
   a first input of the signal processing submodule is connected to a first output of the signal generating submodule, and/or a second input of the signal processing submodule is connected to an output of the forwarding module;
   a third input of the signal processing submodule is connected to the second output of the first control module; and
   the signal processing submodule is configured to output the first display signal and/or the second display signal to the display area.

3. The electronic device of claim 2, further comprising:
   a signal expansion module, wherein:
   an input of the signal expansion module is connected to a first output of the signal processing submodule, a first output of the signal expansion module is connected to a first display screen of the electronic device, a second output of the signal expansion module is connected to a second display screen of the electronic device; and
   the signal expansion module is configured to receive the first display signal and/or the second display signal input by the signal processing submodule, output the first display signal or the second display signal to a display area of the first display screen or output the first display signal or the second display signal to a display area of the second display screen.

4. The electronic device of claim 3, wherein:
   the signal expansion module is disposed in the processing unit.

5. The electronic device of claim 3, wherein:
   the signal expansion module is disposed in the second processor.

6. The electronic device of claim 2, wherein:
   the control signal is a first control signal;
   an input of the first control submodule is connected to the second output of the first control module, and an output of the first control submodule is connected to the third input of the signal processing submodule; and
   the first control submodule is configured to control the signal processing submodule to be connected to the forwarding module and/or to control the signal processing submodule to be connected to the signal generating submodule based on a second control signal input by the first control module.

7. The electronic device of claim 6, wherein:
   the second control submodule is configured to receive a third control signal input by the signal generating submodule or the first processor, and control the first display screen to adjust brightness based on the third control signal.

8. The electronic device of claim 1, wherein:
   the first processor is an independent graphic card, and the second processor is an integrated graphic card.

9. The electronic device of claim 1, wherein the first control module is a microcontroller unit (MCU).

10. The electronic device of claim 1, wherein:
    the second processor is further configured to simultaneously receive the first display signal and the second display signal, output the first display signal to a first display area, and output the second display signal to a second display area.

11. A display method for an electronic device having a first processor and a second processor, comprising:

generating, by the first processor, a first display signal;

generating, by the second processor, a second display signal; and outputting, by the second processor, the second display signal to a display area;

wherein:

the second processor includes a forwarding module, the first processor is directly connected to the forwarding module, and the first display signal generated by the first processor is output to the display area through the forwarding module;

the electronic device includes a first control module, a first output of the first control module being directly connected to a first input of the first processor;

the first control module is configured to control the second processor to output the first display signal and/or the second display signal to the display area, and to control a first output of the first processor to be connected to an input of the forwarding module in the second processor;

the electronic device further includes a processing unit including a second control module, the second processor being disposed in the processing unit, a second output of the first control module being connected to a first input of the second processor through the second control module;

the second control module is configured to receive a control signal input by the first processor, and control the display area to adjust brightness based on the control signal;

the second control module includes a first control submodule and a second control submodule, the second output of the first control module being connected to the first input of the second processor through the first control submodule; and an input of the second control submodule is directly connected to an output of a signal generating submodule of the second processor and a second output of the first processor, and an output of the second control submodule is connected to the first display screen.

12. The display method of claim 11, wherein:

the second processor further includes a signal generating submodule and a signal processing submodule, wherein:

a first input of the signal processing submodule is connected to a first output of the signal generating submodule, and/or a second input of the signal processing submodule is connected to an output of the forwarding module;

a third input of the signal processing submodule is connected to the second output of the first control module; and the signal processing submodule is configured to output the first display signal and/or the second display signal to the display area.

13. The display method of claim 12, wherein:

the electronic device further includes a signal expansion module, wherein:

an input of the signal expansion module is connected to a first output of the signal processing submodule, a first output of the signal expansion module is connected to a first display screen of the electronic device, a second output of the signal expansion module is connected to a second display screen of the electronic device; and the signal expansion module is configured to receive the first display signal and/or the second display signal input by the signal processing submodule, output the first display signal or the second display signal to a display area of the first display screen or output the first display signal or the second display signal to a display area of the second display screen.

14. The display method of claim 13, wherein:

the signal expansion module is disposed in the processing unit.

15. The display method of claim 13, wherein:

the signal expansion module is disposed in the second processor.

16. The display method of claim 12, wherein:

the control signal is a first control signal;

an input of the first control submodule is connected to the second output of the first control module, and an output of the first control submodule is connected to the third input of the signal processing submodule; and the first control submodule is configured to control the signal processing submodule to be connected to the forwarding module and/or to control the signal processing submodule to be connected to the signal generating submodule based on a second control signal input by the first control module.

17. The display method of claim 16, wherein:

the second control submodule is configured to receive a third control signal input by the signal generating submodule or the first processor, and control the first display screen to adjust brightness based on the third control signal.

18. The display method of claim 11, wherein:

the first processor is an independent graphic card, and the second processor is an integrated graphic card.

* * * * *